(12) United States Patent
Minami

(10) Patent No.: US 6,851,728 B2
(45) Date of Patent: Feb. 8, 2005

(54) PIPE-COUPLING DEVICE

(75) Inventor: Masafumi Minami, 1202-1 Hinowo, Sakai-shi, Osaka 590-0142 (JP)

(73) Assignees: Hakko Metal Industries Ltd., Sakai (JP); Masafumi Minami, Osaka (JP)

(*) Notice: Subject to any disclaimer, the term of this patent is extended or adjusted under 35 U.S.C. 154(b) by 0 days.

(21) Appl. No.: 10/460,395

(22) Filed: Jun. 13, 2003

(65) Prior Publication Data

US 2004/0007874 A1 Jan. 15, 2004

(30) Foreign Application Priority Data

Jul. 10, 2002 (JP) ........................................ 2002-201688

(51) Int. Cl.[7] .............................................. F16L 17/00
(52) U.S. Cl. .................... 285/339; 285/323; 285/232; 285/342; 285/383; 285/113
(58) Field of Search ................................ 285/108, 105, 285/255, 322, 343, 389, 339, 323, 232, 342, 383, 113, 243, 249, 104

(56) References Cited

U.S. PATENT DOCUMENTS

| | | | | |
|---|---|---|---|---|
| 2,034,644 A | * | 3/1936 | Walsh | 285/243 |
| 2,531,922 A | * | 11/1950 | Seamark | 285/104 |
| 2,779,610 A | | 1/1957 | Risley | |
| 4,613,158 A | * | 9/1986 | Ekman | 285/339 |
| 5,207,459 A | | 5/1993 | Glover | |
| 5,957,509 A | | 9/1999 | Komolrochanaporn | |
| 6,106,029 A | | 8/2000 | DeMore et al. | |
| 6,378,915 B1 | | 4/2002 | Katz | |

FOREIGN PATENT DOCUMENTS

| | | |
|---|---|---|
| GB | 2 043 814 | 10/1980 |
| GB | 2043814 | 10/1980 |
| JP | 50-2575 | 1/1975 |
| JP | 10-122460 | 5/1998 |
| JP | 2003-004934 | 3/2003 |

* cited by examiner

Primary Examiner—Eric K. Nicholson
Assistant Examiner—Aaron Dunwoody
(74) Attorney, Agent, or Firm—Armstrong, Kratz, Quintos, Hanson & Brooks, LLP

(57) ABSTRACT

A pipe-coupling device comprises a joint body having an opening with external threads to receive a pipe, a locknut having internal threads engaged with the external threads of the joint body, an annular core member disposed within the locknut, and a plurality of locking members retained in apertures of the core member to be spaced circumferentially apart from each other. Upon tightening rotation of the locknut around the joint body, the internal conical surface of the locknut slidably contacts with the conical surfaces of the locking members so as to press the locking members radially inwardly, to cause the gripping portions of the locking members come into gripping engagement with the outer periphery of the inserted pipe, thereby strongly preventing withdrawal of the pipe from the joint body even when the pipe is made of hard material.

8 Claims, 11 Drawing Sheets

(a)    (b)

Fig.10  before tightening ←→ after tightening
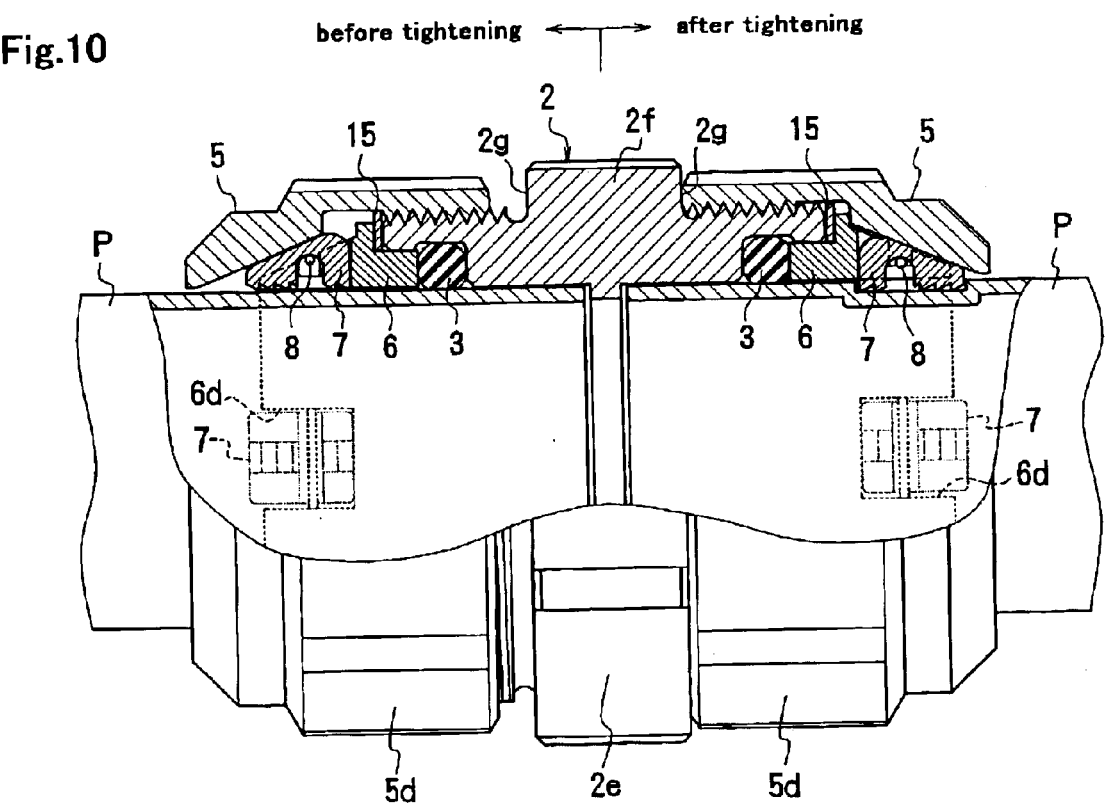
Fig.11
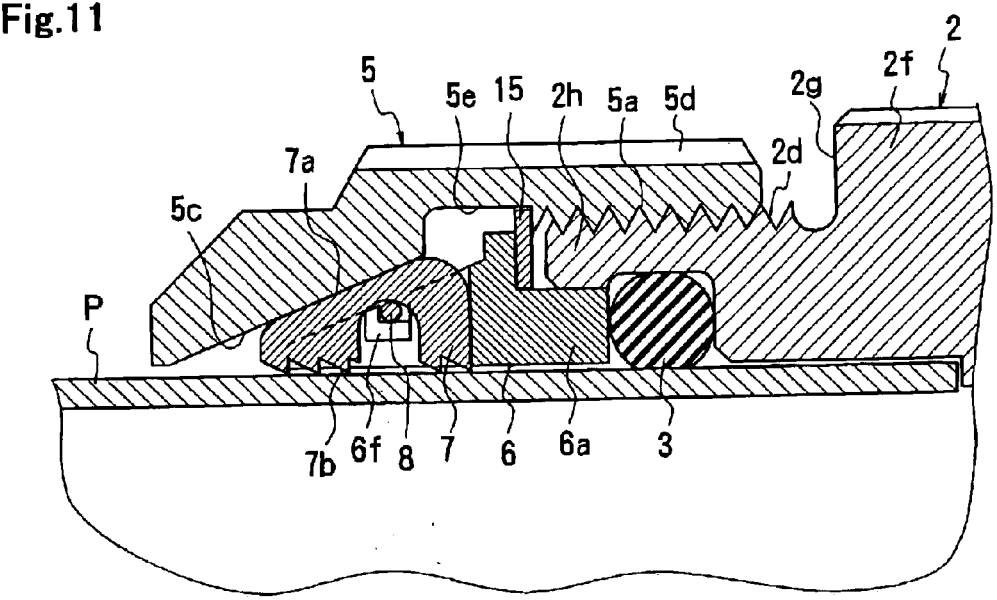

PIPE-COUPLING DEVICE

FIELD OF THE INVENTION

The present invention relates to a pipe-coupling device, such as a pipe joint that can be used for joining together ends of pipes, e.g., water supply pipes.

BACKGROUND OF THE INVENTION

Generally, a pipe joint having internal threads is used for joining together ends of pipes, e.g. water pipes laid under the ground. In those cases, the pipe has external threads formed at the end thereof (in advance), so that the pipe can be coupled by engaging the external threads of the pipe with the internal threads of the pipe joint. However, in this coupling operation, the external threads should necessarily be formed at the end of the pipe beforehand, which requires a lot of time for processing the screw threads and for the connecting operation of the pipes in situ.

In order to solve the above-described problem, the Japanese patent application publication JP10-122460A discloses a pipe joint that comprises a female body, an outer collar, an inner collar, a pressing member, and a coil spring. The coil spring is arranged between the female body and the inner collar. The outer collar has a tapered surface in its inner periphery that increases in diameter toward the female body. The pressing member is constructed such that its outer periphery comes in contact with the tapered surface of the outer collar, whereas the edge formed in its inner surface engages with the outer periphery of the pipe.

In case of this pipe joint, it is not necessary to form external threads at an end of the pipe. The pipe-coupling operation is simplified because it requires only inserting the pipe through the inner collar to the female body. Moreover, when the inner collar is pressed against the female body by the spring outwardly in the axial direction, the pressing member is pressed inwardly in radial direction by the tapered surface of the outer collar. As a result, the edge of the pressing member comes into gripping engagement with the outer periphery of the pipe so as to prevent the pipe from being pulled out of the pipe joint.

In case of the pipe joint having the above-described construction, the inner collar needs to be pressed against the female body outwardly in the axial direction so that the pressing member comes into gripping engagement with the outer periphery of the pipe. Although the coil spring is arranged between the female body and the inner collar, the pressing force of the spring is too weak to make the pressing member strongly engage with the outer periphery of the pipe. If the pipe is made of relatively soft resin, the pressing member may be able to bite into the pipe. However, if the pipe is made of hard resin or metal, it is impossible to make the edge of the pressing member bite into the pipe by means of the pressing force of the coil spring alone. As a result, the pipe joint fails to prevent the pipe from withdrawal. For example, when a large tensile force generated by a high water pressure acts onto the pipe, the pipe may easily be withdrawn from the pipe joint.

SUMMARY OF THE INVENTION

Accordingly, the present invention seeks to provide a pipe-coupling device which can simplify pipe-connecting operation, and which can grip the inserted pipe strongly enough to prevent withdrawal of the pipe even when the pipe is made of hard material.

The present invention also seeks to provide a pipe-coupling sub-assembly which can simplify pipe-connecting operation, and which can grip the inserted pipe strongly enough to prevent withdrawal of the pipe even when the pipe is made of hard material.

In accordance with a first aspect of the present invention, the pipe-coupling device comprises a joint body, a locknut member, an annular core member, and a plurality of locking members. The joint body has an opening to receive a pipe and has external threads formed in its outer periphery around the opening. The locknut member has a first end portion and a second end portion. The first end portion includes internal threads in its inner periphery to engage with the external threads of the joint body, and the second end portion includes an internal conical surface, which increases in diameter in an axial direction toward the first end portion. The annular core member is disposed within the locknut member, and is provided with a guide portion at one end thereof and with a plurality of separate apertures formed in the guide portion spaced circumferentially from each other. The locking members are adapted to be received in the apertures of the core member. Each of the locking members has gripping portion in its inner surface to come into gripping engagement with an outer periphery of the pipe inserted into the opening of the joint body, and has a contact portion in its outer surface to contact with the internal conical surface of the locknut member. The thickness of the locking member is so set that upon rotation of the locknut member onto the joint body in tightening direction, the internal conical surface of the locknut member slidably contacts with the contact portions of the locking members so as to press them radially inwardly to cause the gripping portions of the locking members come into gripping engagement with the outer periphery of the inserted pipe.

Therefore, upon rotation of the locknut member around the joint body, the internal conical surface of the locknut member slidably contacts with the contact portions of the locking members so as to press the locking members radially inwardly. The pressing force toward the locking members inwardly in radial direction is generated by the threads engagement of the locknut member with the joint body, which is different from an urging force of a spring. Accordingly, the pressing force toward the locking members is so large that the gripping portions of the locking members can securely come into gripping engagement with (bite into or dent into) the outer periphery of the pipe even when the pipe is made of hard resin or metal. Thus, the pipe is securely prevented from withdrawal even when a large tensile force generated by a high water pressure, for example, acts onto the pipe.

Moreover, upon rotation of the locknut member in the tightening direction, the internal conical surface of the locknut member comes into pressure contact with the contact portions of all of the locking members simultaneously, so as to uniformly press those locking members inwardly in radial direction. As a result, the pipe-coupling device of the present invention can obtain circumferentially well-balanced grip toward the inserted pipe.

Furthermore, since it is not necessary to previously form external threads in the outer periphery of the pipe, and since the coupling operation requires only the rotation of the locknut, skilled operatives are not needed, leading to improved work efficiency.

The joint body of the present invention is not restricted to a tubular body but it includes any type of body or component that has at least one opening to receive a pipe and external threads formed in its outer periphery around the opening.

In case the pipe is a thick-walled pipe, the gripping portion formed in the inner surface of the locking member may preferably consist of sharp claws that can bite into the outer periphery of the inserted pipe. However, in case the pipe is a thin-walled pipe, the gripping portion needs not to be sharp, as far as the gripping portion is able to dent the outer periphery of the pipe to obtain enough gripping force. In short, the configuration of the gripping portion can be selected in accordance with the features of the pipe to be inserted.

In accordance with further aspects of the present invention, the pipe-coupling device further comprises a substantially annular wire arranged on the outer periphery of the core member. The wire may preferably be made of a metallic curled wire whose terminals overlap with each other. The locking member is provided with a through path, which is formed by a through hole or an inner groove extending in the widthwise direction. The wire passes through the through path to prevent the locking members from being dropped out of the core member inwardly in radial direction. When a resilient wire is used as the wire, the locking members can largely protrude inwardly in radial direction beyond the core member when the locknut member is tightened. This is advantageous because the locking members can came into gripping action with the pipe deeply, resulting to provide large gripping force against the pipe.

In accordance with still further aspects of the present invention, locking members are configured to increase in thickness from one end to the other end in lengthwise direction, in a shape of a wedge, for example. The contact portions of the locking members are configured to be conical surfaces or inclined surfaces whose inclinations substantially correspond to the inclination of the internal conical surface of the locknut member. With this configuration, the gripping portion of the locking members can come into gripping engagement with the inserted pipe without tilting. Also, when the locknut member is rotated in the tightening direction, the locking members take parallel displacement inwardly in radial direction, thus exerting stable clamping force against the pipe.

In accordance with additional aspects of the present invention, the joint body has internal seating formed in the inner periphery of the opening. A sealing ring for acting between the joint body and the inserted pipe is received in the internal seating in such a way that one side surface and outer surface of the sealing ring are supported by the internal seating. The core member has a boss portion formed at the other end thereof opposite to the guide portion, such that the boss portion pushes the sealing ring toward the internal seating in the axial direction.

An O-ring is generally used as the sealing ring acting between the joint body and the inserted pipe. On the other hand, there is tolerance in diameter of the inserted pipe. In case a pipe having a smaller diameter is inserted, the sealing effect of the O-ring would be insufficient so that it may cause some troubles like water leakage. Accordingly, the size of the O-ring is usually selected such that a pipe having a smallest diameter within the tolerance can be sealed sufficiently. However, it is difficult to insert a pipe having a larger diameter into such an O-ring, and the O-ring easily gets damaged. Thus, it is difficult to obtain stable sealing effect due to the tolerance of the diameter of the inserted pipe.

In accordance with further additional aspects of the present invention, the locking members are pressed in an axial direction inwardly of the joint body, so that the core member is also pressed in the axial direction inwardly of the joint body. Owing to this inward movement of the core member, the sealing ring is pressed from both sides in the axial direction by the inner seating and the boss portion of the core member, resulting that the sealing ring swells inwardly in radial direction to come into pressure contact with the outer periphery of the pipe. Consequently, the sealing ring of the present invention can attain a stable sealing effect even when there is a tolerance of the diameter of the inserted pipe.

In accordance with still further additional aspects of the present invention, the joint body is provided with a stopper wall in its outer periphery. Since the stopper wall stops an edge of the first end portion of the locknut member after the locknut member is rotated in the tightening direction to a certain extent, the locknut member is prevented from being tightened excessively.

The gripping portion of the locking member comes into gripping engagement with the pipe with a clamping force corresponding to the degree of tightening rotation of the locknut member. However, the tightening rotation sometimes exceeds or falls short of the desired degree depending on the operator.

In this respect, by rotating the locknut member until the axial edge of the locknut member comes into pressure contact with the stopper wall, the extent of the tightening rotation can be limited to a prescribed degree. Furthermore, due to the repulsion forces generated by the locknut member and the stopper wall, the engaging threads of the locknut member and the joint body are prevented from loosening.

In accordance with other aspects of the present invention, the core member is provided with circumferential grooves on the outer surface of the guide portion. The circumferential grooves receive the wire, allowing the wire to radially displace therein.

In accordance with other additional aspects of the present invention, the wire is made of a metallic curled wire deformable in radial direction. In order to prevent the locking member from dropping out of the wire, the terminals of the wire may preferably overlap with each other.

In case the wire has resilient force in radially expanding direction, the locking members can be urged radially outwardly so that the contact portions thereof can stably contact with the internal conical surface of the locknut member. Further, since the gripping portion of the locking member does not protrude inwardly beyond the core member at the untightened condition, the pipe can be inserted into the core member without being interfered by the locking members.

In case the wire has resilient force in radially contracting direction, the wire can be easily fitted into the circumferential grooves of the core member so that the core member and the locking members can be easily assembled into the locknut member.

Also, when the wire has resilient force in radially contracting direction, the locking members may protrude inwardly beyond the core member at the untightened condition so as to interfere the insertion of the pipe. In order to avoid this interference, the core member may preferably be provided with, in the circumferential groove thereof, a plurality of projections each of which has a shallow groove for sustaining the wire. The bottom of the shallow groove may preferably be located at a radially higher position compared with that of the circumferential groove. This case has the following advantages; the contact portions of the locking members can stably contact with the internal conical surface of the locknut member, the gripping portion of the locking member does not protrude inwardly beyond the core member at the untightened condition, and the core member and the locking members can be easily assembled into the locknut member.

The present invention can be applied to a pipe-coupling sub-assembly, which includes the locknut member, the core member and the locking members, without the joint body.

In this case, if the core member came out of the locknut member, the locking members would also drop out of the locknut member together with the core member. In this respect, the pipe-coupling sub-assembly of the present invention may preferably comprise an inner peripheral groove formed in the locknut member between the internal threads and the internal conical surface, and a stopper ring fitted in the inner peripheral groove. Due to this stopper ring, the core member can be prevented from coming out of the locknut member in the axial direction, thus enabling convenient handling of this sub-assembly as a single component.

In place of the stopper ring, the core member may be provided with a claw portion in the outer periphery thereof to project outwardly in radial direction. The claw portion fits in the inner peripheral groove of the locknut member such that the core member is prevented from dropping out of the locknut member in the axial direction. In this case, since it is not necessary to prepare additional parts like the stopper ring, the number of parts is reduced, resulting in a lower cost.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 10 is a part sectional side view showing a third embodiment in which the present invention is applied to a pipe joint;

FIG. 11 is a partially enlarged sectional view of the pipe joint shown in FIG. 10;

DETAILED DESCRIPTION OF THE PREFERRED EMBODIMENT

FIGS. 1 to 8 show a first embodiment in which the present invention is applied to a pipe joint. This pipe joint is used for joining together adjacent ends of two ordinary water supply pipes.

The pipe joint 1 in this embodiment comprises a joint body 2 consisting of a tubular component whose both ends are open. The adjacent ends of two water supply pipes P are inserted into the joint body 2 oppositely to each other. The pipes P are formed of metallic pipe such as stainless steel pipe (e.g. JIS-G3448), which is relatively small in its diameter and in its thickness. Since the pipe joint 1 has a symmetrical construction, the following description of its construction at one end may be applied to the other end as well. The condition of the pipe joint before tightening operation is shown in the left side of FIG. 1, whereas the condition of the pipe joint after tightening operation is shown in the right side of FIG. 1.

Figure 5:
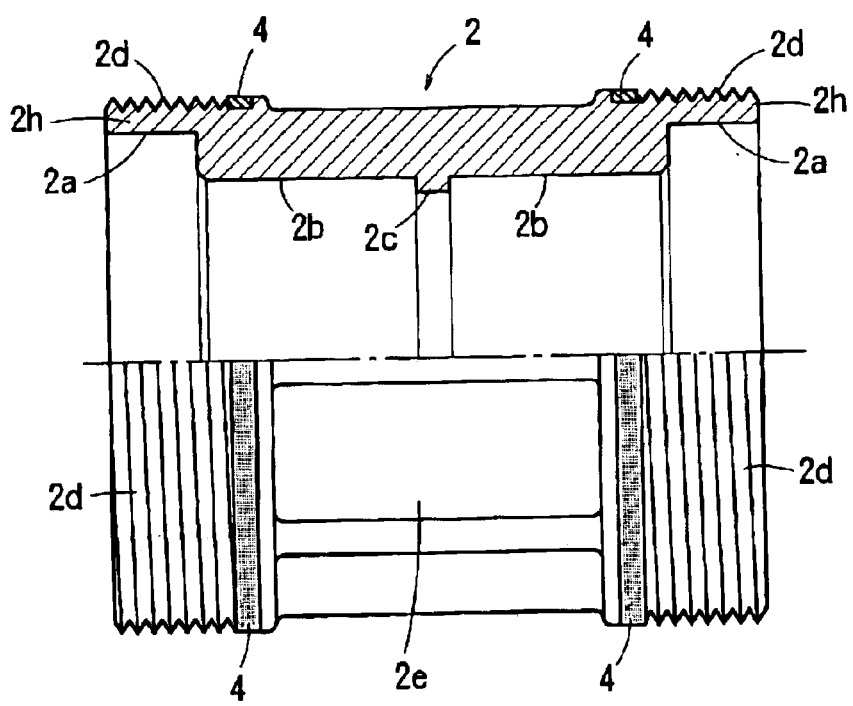
FIG. 5 is a half sectional side view of the joint body shown in FIG. 1.

The joint body 2, which is formed of metallic material such as stainless steel, has openings 2h at both ends thereof. As shown in FIG. 5, the joint body 2 has a step-shaped internal seating 2a in the inner periphery of each opening 2h. The joint body 2 further has a guide surface 2b in the middle portion of the inner periphery of the joint body 2 for holding the outer peripheries of the pipes P. A stopper convex 2c for defining the entry distances of the pipes P is formed at the center of the guide surface 2b. A sealing ring 3, such as an O-ring, for acting between the joint body 2 and the inserted pipe P is fitted into the internal seating 2a such that the sealing ring 3 contacts with the internal seating 2a at one side in the axial direction and at the outer side in the radial direction. Further, the joint body 2 has external threads 2d formed in the outer periphery of each opening 2h, and a colored ring (a mark to indicate tightened position) 4 embedded adjacent to the external threads 2d at a position closer to the center of the joint body 2. This colored ring 4 can be formed of resin, rubber, or paint. In addition, a tool-engaging surface 2e, configured to be a polygonal surface such as an octagonal surface, is formed in the middle area of the outer periphery of the joint body 2, so that tools such as a wrench can engage with this surface 2e.

Figure 6:
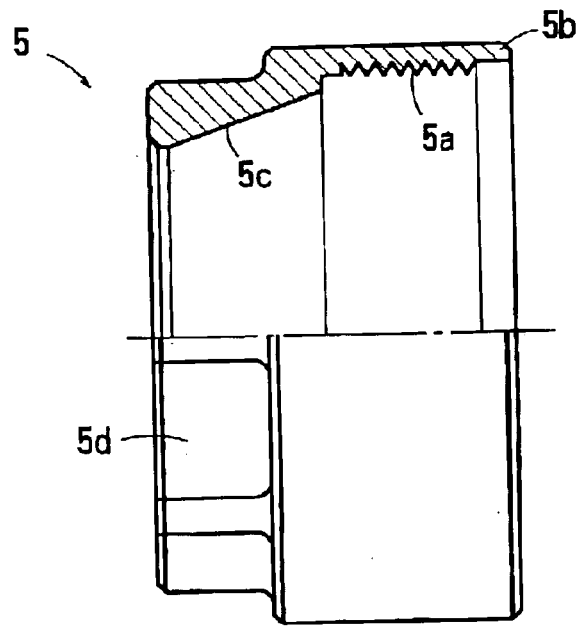
FIG. 6 is a half sectional side view of the locknut member shown in FIG. 1.

The external threads 2d of the joint body 2 engages with a locknut member 5 which is made of metallic material such as stainless steel. As shown in FIG. 6, the locknut 5 has, in its inner periphery at one end thereof in the axial direction, internal threads 5a to be engaged with the external threads 2d. A covering portion 5b without any threads is formed at the tip-end of the locknut 5. When this covering portion 5b covers over the colored ring 4 embedded in the joint body 2, it indicates that the tightening operation is completed. The locknut 5 also has, at the other end thereof, an internal conical surface 5c in its inner periphery, and a tool-engaging surface 5d, having a polygonal surface such as an octagonal surface, in its outer periphery.

Figure 7:
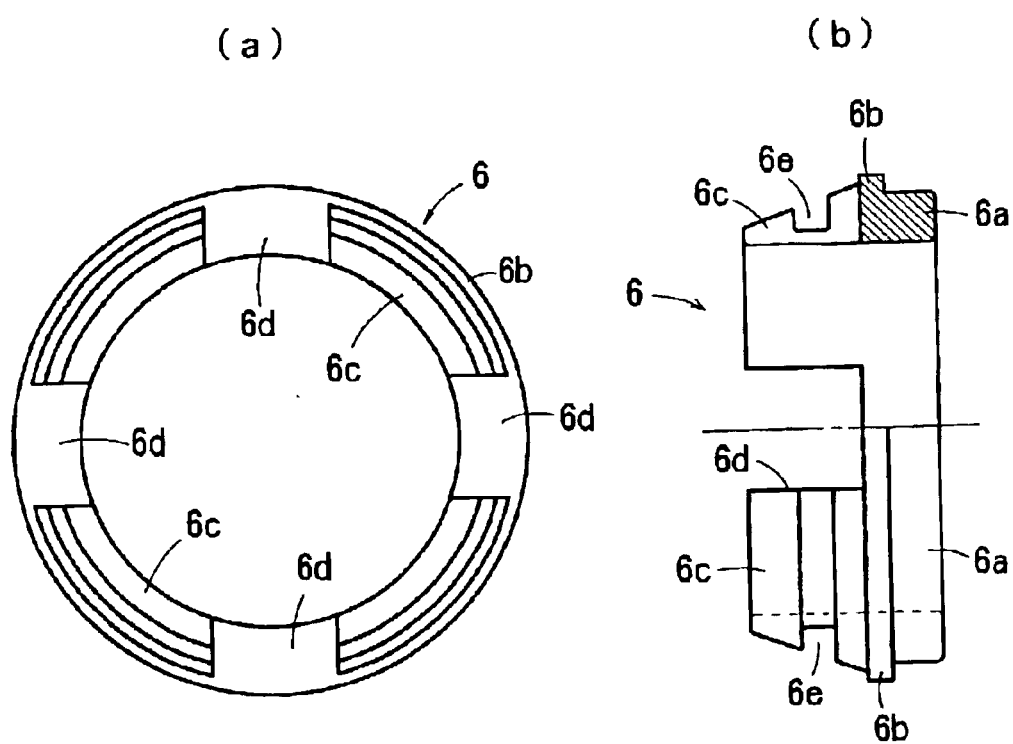
FIG. 7 shows a front view and a half sectional side view of the core member shown in FIG. 1.

An annular core member 6 made of metal or resin is disposed within the locknut 5. The internal diameter of the core member 6 is substantially identical to that of the guide surface 2b of the joint body 2. As shown in FIG. 7, the core member 6 has an annular boss portion 6a, which is integrally formed with the core member 6 at one end portion in the axial direction. The boss portion 6a is inserted into the inner seating 2a of the joint body 2 so that this boss portion 6a presses the sealing ring 3 in an axial direction inwardly of the joint body 2. The core member 6 has, at the other end portion opposite to the boss portion 6a, a substantially annular guide portion 6c, which has frustoconical outer surface increasing in diameter in an axial direction toward the one end of the core member. A plurality of apertures 6d for receiving locking members 7 are formed in this guide portion 6c equally spaced circumferentially from each other. In this embodiment, the apertures 6d are four openings that are open in an axial direction outwardly, and circumferentially spaced apart by 90 degrees. Four locking members 7 are positioned in the core member 6 equally spaced circumferentially from each other. In case the core member 6 is required to have a larger strength, the apertures 6d may be configured to be window holes that surround the locking members 7. Circumferential groove 6e for receiving a metallic wire 8, which will be explained later, is formed in the outer surface of the guide portion 6c.

The core member 6 has a flange 6b between the boss portion 6a and the guide portion 6c in its outer periphery. When the locknut 5 is tightened, this flange 6b is stopped by the end surface of the joint body 2, resulting that the flange 6b prevents the boss portion 6a from loading excessive compressing force onto the sealing ring 3. Further, since the axial movement of the core member 6 is stopped owing to the flange 6b, the locking members 7 can move only inwardly in radial direction in accordance with tightening rotation of the locknut 5.

Figure 2:
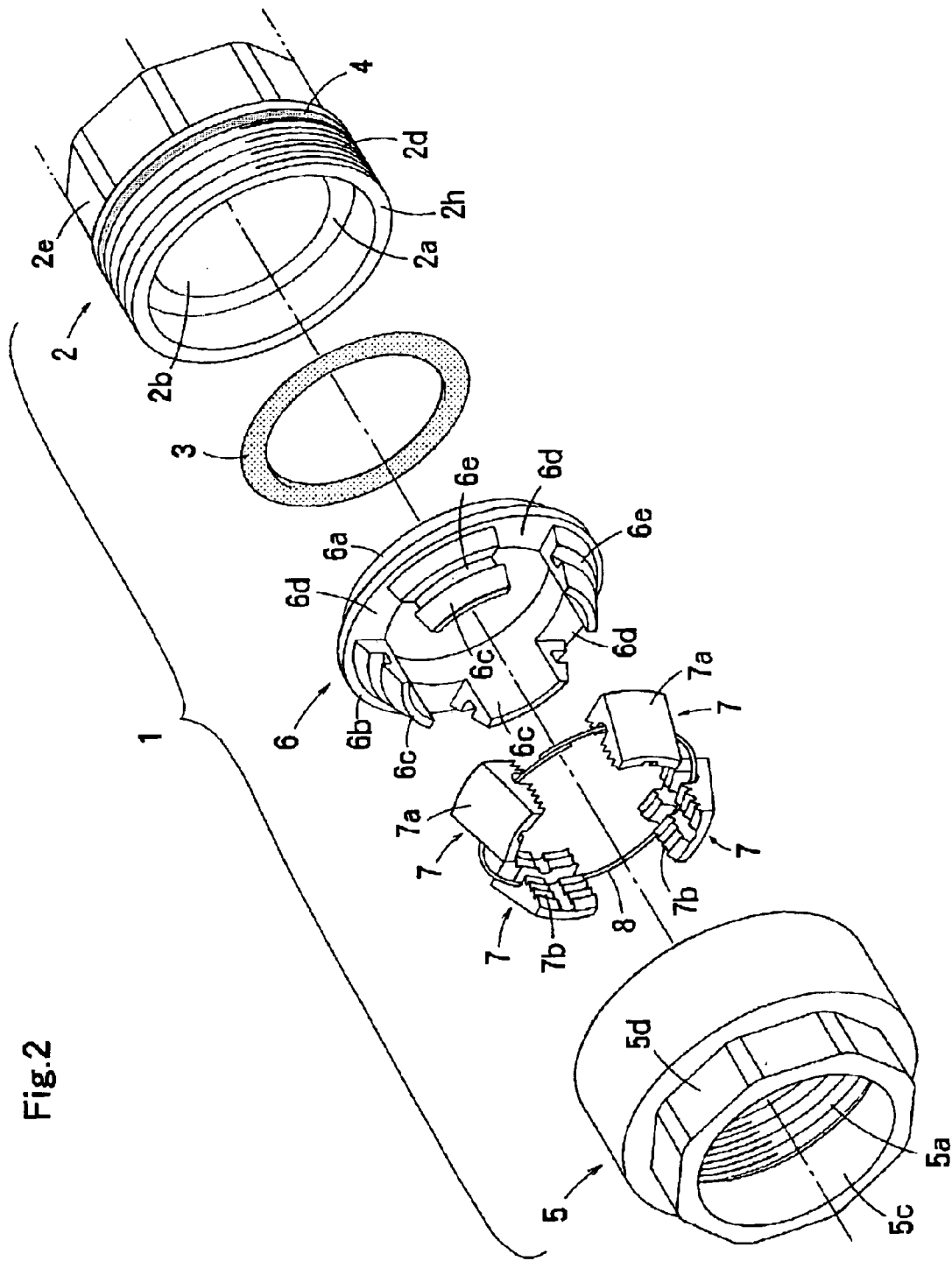
FIG. 2 is an exploded perspective view showing the parts of the pipe joint shown in FIG. 1.
Figure 4:
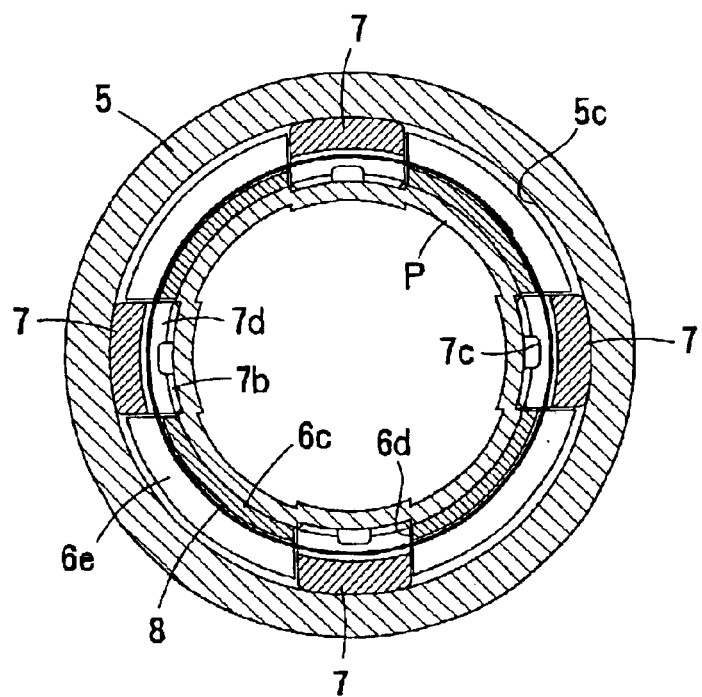
FIG. 4 is a sectional view taken on the section line A—A in FIG. 1.
Figure 8:
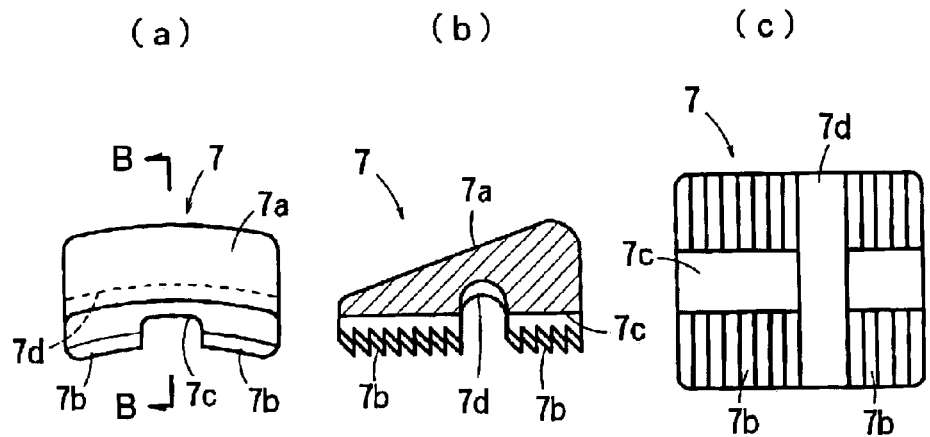
FIG. 8 shows a front view, a section on the line B—B and a bottom view of the locking member shown in FIG. 1.

As shown in FIG. 8, the locking member 7 is a metallic component having a generally wedge-shaped cross section, which is configured to increase in thickness from one end to the other end in lengthwise direction. The thickness of the locking member 7 is set to be larger than that of the guide portion 6c of the core member 6. The locking member 7 has a higher rigidity than that of the pipe P by means of hardening, for example. As shown in FIG. 2, the locking member 7 has a conical outer surface 7a, which is configured to increase in diameter in an axial direction toward the joint body 2. The inclination of the outer surface 7a of the locking member 7 substantially corresponds to the inclination of the internal conical surface 5c of the locknut 5. The locking member 7 has a gripping portion 7b in its inner surface to come into gripping engagement with an outer periphery of the inserted pipe P. This inner surface of the locking member 7 is curved so that the gripping portion 7b can engage with the outer periphery of the pipe P in wider area. In this embodiment, the gripping portion 7b is formed by a dentiform serration having a sawlike cross section. The inner surface of the locking member 7, with the gripping portion 7b formed therein, is also provided with a longitudinal groove 7c extending in the longitudinal direction, as well as a transverse groove 7d extending in the widthwise direction vertically to the longitudinal groove 7c. The longitudinal groove 7c is located at the center of width of the locking member 7. Since the gripping portion 7b is divided into two sections by the longitudinal groove 7c, the gripping portion 7b can engage effectively with various pipes having different diameters. The transverse groove 7c passes through the center of gravity of the locking member 7. This transverse groove 7d, being deeper than the longitudinal groove 7c, has a curved surface at its bottom. The metallic wire 8 is inserted in this transverse groove 7d in order to prevent the locking members 7 from being dropped out of the core member 6 inwardly.

Figure 1:
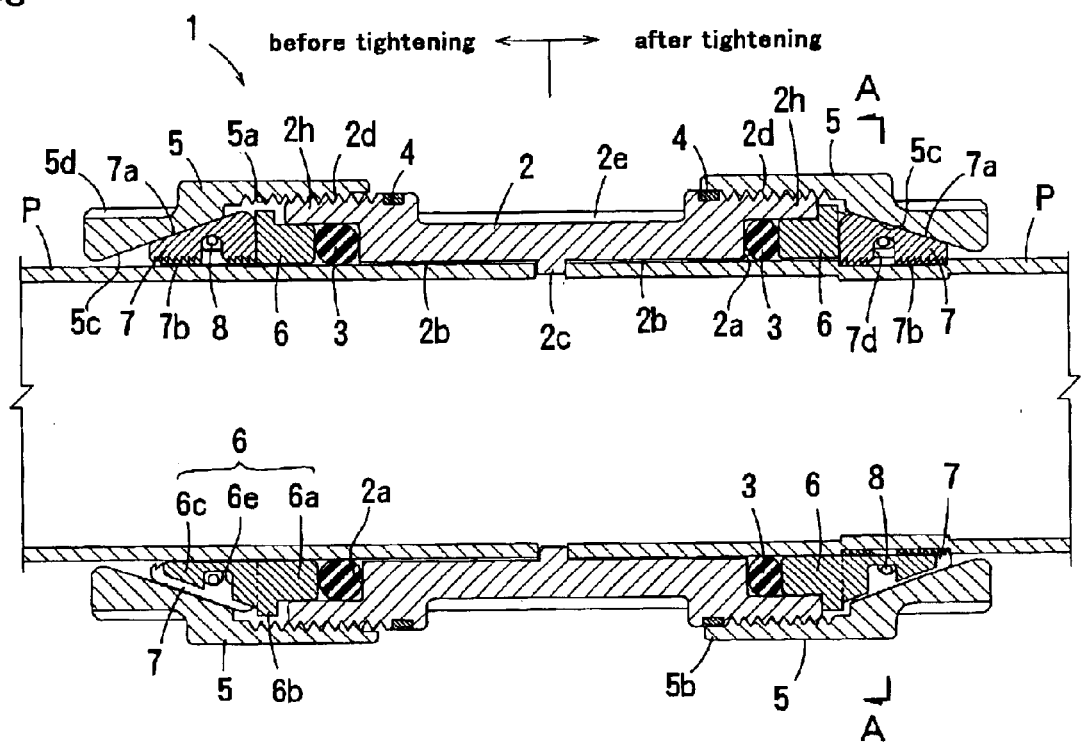
FIG. 1 is a longitudinal cross-sectional view showing a first embodiment in which the present invention is applied to a pipe joint, which is used for joining together adjacent ends of two pipes, e.g. water supply pipes.
Figure 3:
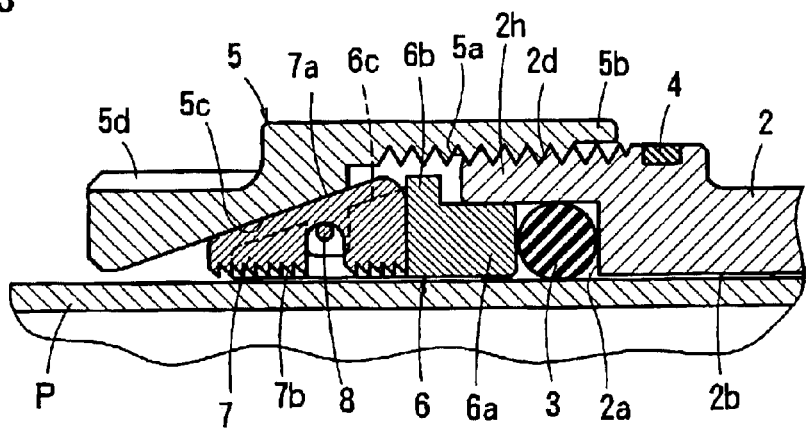
FIG. 3 is a partially enlarged view of the pipe joint shown in FIG. 1.

As shown in FIG. 2, the wire 8 in this embodiment is a metallic curled wire whose terminals overlap with each other. In place of a curled wire, an endless circular wire or a split ring can be used as the wire 8. In case the wire 8 is a curled wire, its terminals can also be bent and hooked to the core member 6 instead of overlapping with each other. In this embodiment, the wire 8 has resilient force in expanding direction. The diameter of the wire 8 under unloaded condition is set to be larger than the diameter as shown in FIG. 1. Accordingly, the locking members 7 are urged outwardly in the radial direction by means of the wire 8 in such a way that the outer surfaces 7a contact with the internal conical surface 5c of the locknut 5. As a result, the pipe P can be smoothly inserted through the core member 6 since the locking member does not protrude inwardly beyond the core member 6.

The method for coupling a pipe P with the pipe joint 1 will be explained hereinbelow.

First, the sealing ring 3 is inserted into the internal seating 2a of the joint body 2, while the core member 6 and the locking members 7 are assembled into the locknut 5. At the time of this assembly, the wire 8 is received in the circumferential groove 6e of the core member 6, and the locking members 7 are arranged in the apertures 6d of the core member 6 such that the wire 8 passes through the transverse grooves 7d. The core member 6 having the locking members 7 is introduced into the interior of the locknut 5.

Next, as shown in the left hand side of FIG. 1, the external threads 2d of the joint body 2 are lightly engaged with the internal threads 5a of the locknut 5, so that the boss portion 6a of the core member 6 is inserted into the internal seating 2a. At this time, the outer surfaces 7a of the locking members 7 stably contact with the internal conical surface 5c of the locknut 5 so that the locking members 7 do not protrude inwardly beyond the inner surface of the core member.

Then, the pipe P is inserted into the pipe joint 1 assembled as described above. At this time, since the sealing ring 3 is not pressed at its both sides in the axial direction, it does not swell out axially inwardly. As a result, the pipe P is smoothly inserted without being interfered by the locking members 7 or the sealing ring 3 (as shown in the left side of FIG. 1).

After the pipe P is inserted until it is stopped by the stopper convex 2c, the locknut 5 is rotated in the tightening direction with respect to the joint body 2. By this tightening operation, the internal conical surface 5c of the locknut 5 comes into pressure contact with the outer surfaces 7a of the locking members 7, so that the conical surface 5c pushes the locking members 7 inwardly both in the axial direction and in the radial direction of the joint body 2 simultaneously.

Due to the axial movement of the locking members 7, the core members 6 are also pushed inwardly in the axial direction into the joint body 2 so that the flange 6b of the core member 6 is stopped by the end surface of the joint body 2.

After the core member 6 is stopped in its axial movement, the locking members 7 are moved inwardly only in radial direction in accordance with the rotation of the locknut 5. Thus, the gripping portions 7b of the locking members 7 come into gripping engagement with (bite into or dent into) the outer periphery of the pipe P so as to exert a strong gripping force. Since the inclination of the conical surface 5c of the locknut 5 substantially corresponds to the inclination of the outer surfaces 7a of the locking members 7, the locking members 7 are subjected to almost parallel displacement in radial direction, whereby the gripping portions 7b can come into gripping engagement with the pipe P without tilting. At the same time, since the sealing ring 3 is pushed by the boss portion 6a of the core member 6 axially, the sealing ring 3 swells out inwardly in radial direction. As a result, the inner periphery of the sealing ring 3 sticks fast to the outer periphery of the pipe P, so as to attain a good sealing effect.

According as the locknut 5 is rotated in the tightening direction, the plurality of locking members 7 equally move inwardly in the radial direction, resulting that the pipe P is prevented from eccentricity with respect to the joint body 2. When the locknut 5 is rotated to reach the tightened position, the covering portion 5b of the locknut 5 covers the colored ring 4 embedded in the joint body 2 (as shown in the right hand side of FIG. 1). In this way, the completion of the tightening operation can be confirmed.

Figure 9:
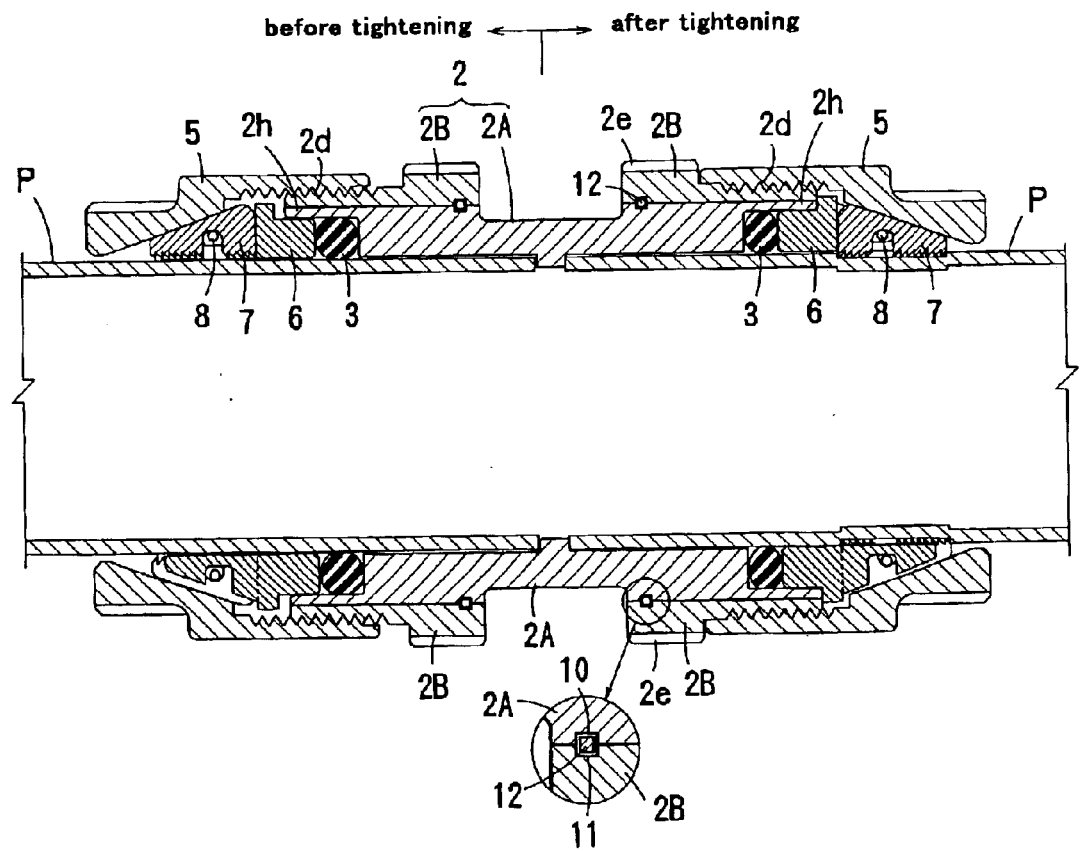
FIG. 9 is a longitudinal cross-sectional view showing a second embodiment in which the present invention is applied to a pipe joint.

FIG. 9 shows the second embodiment of the present invention.

In this embodiment, the joint body 2 consists of a tubular body 2A and two sleeves 2B that are rotatably mounted on the outer periphery of the tubular body 2A on the both openings 2h. Each of the sleeves 2B has, in its outer periphery, external threads 2d to be engaged with the locknut 5. The pipe joint according to this embodiment is similar in structure to the pipe joint 1 according to the first embodiment except the joint body 2 (2A and 2B). Therefore, parts of the second embodiment identical to those of the first embodiment are denoted by the same reference numerals, to omit redundant description.

The outer periphery of the tubular body 2A and the inner periphery of the sleeve 2B have circumferential grooves 10 and 11 respectively at positions opposing to each other to form a circumferential space. A stopper ring 12 made of a split ring is inserted in this circumferential space so as to prevent the sleeve 2B from sliding in the axial direction while the ring 12 allows the relative rotation of the sleeve 2B with respect to the tubular body 2A. The method for allowing the relative rotation of the sleeve 2B with respect to the tubular body 2A is not restricted to this usage of the stopper ring 12. The sleeve 2B also has a tool-engaging surface 2e in its outer periphery.

According to this embodiment, by engaging the locknut 5 with the external threads 2d of the sleeve 2B while restraining the sleeve 2B from rotation using some tool, the locking members 7 come into gripping engagement with the pipe P in the same way as they do in the first embodiment.

In case a twisting force acts on the pipe P which has been coupled with the pipe joint of this embodiment, the locking members 7, the core member 6, the locknut 5 and the sleeve 2B can integrally rotate with this pipe P with respect to the joint body 2A. As a result, the twisting force is absorbed so that the tightened engagement of the locknut 5 with the external threads 2d of the sleeve 2B can be prevented from loosening.

FIGS. 10 to 14 show the third embodiment of the present invention.

In this embodiment, the joint body 2 has a thick portion 2f in the middle portion of its outer periphery. The both side surfaces of the thick portion 2f form stopper walls 2g to which the inward ends of the locknuts 5 are axially pressed when the locknuts 5 are tightened to this joint body 2. By making the inward end of the locknut 5 come in pressure contact with the stopper wall 2g, the extent of the tightening rotation of the locknut 5 is limited. Further, the engaged threads of the locknut 5 and the joint body 2 can be prevented from loosening due to the repulsion forces generated by the locknut 5 and the stopper wall 2g. The joint body 2 also has a tool-engaging surface 2e in the outer periphery of the thick portion 2f so that tools such as a wrench can fit onto this surface 2e.

Figure 12:
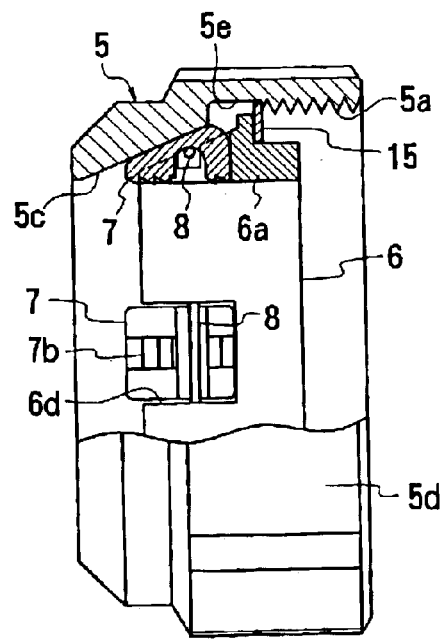
FIG. 12 is a part sectional side view of a pipe-coupling sub-assembly used in the pipe joint shown in FIG. 10.

As shown in FIGS. 11 and 12, the inner surface of the locknut 5 has an inner peripheral groove 5e formed between the internal threads 5a and the conical surface 5c. By fitting a stopper ring 15 in this inner peripheral groove 5e after inserting the core member 6 together with the locking members 7 and the wire 8 into the locknut 5, the core member 6 is prevented from dropping out of the locknut 5 in the axial direction. The stopper ring 15 may preferably be formed of an elastic ring such as a resin ring or a metallic split ring, for example. Since the core member 6, the locking members 7 and the wire 8 are integrally assembled into the locknut 5 to be a single component as described above, those parts can be handled as a pipe-coupling sub-assembly as shown in FIG. 12.

In this embodiment, a tool-engaging surface 5d is formed in the outer periphery of the locknut 5 at a portion radially opposing to the internal threads 5a and the inner peripheral groove 5e.

Figure 13:
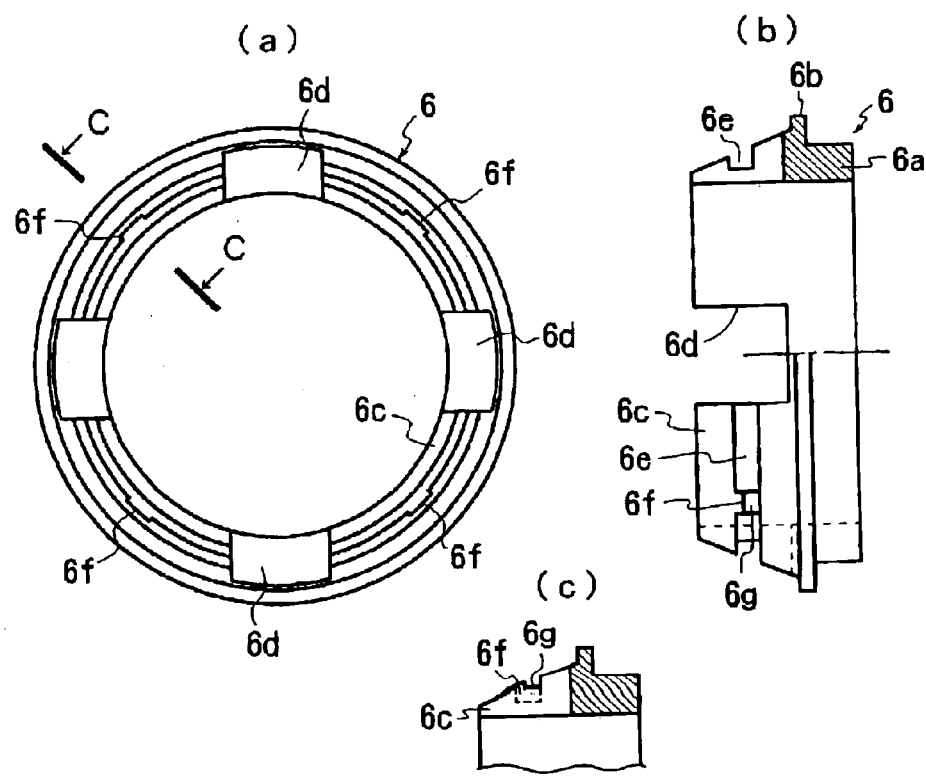
FIG. 13 shows a front view, a half sectional side view and a section taken on the line C—C of the core member used in the pipe joint shown in FIG. 10.

As shown in FIG. 13, a plurality of (four in this embodiment) small projections 6f are formed circumferentially equally apart from each other in the circumferential groove 6e. Each of those projections 6f has a shallow groove 6g for sustaining the wire 8. The bottom of the shallow groove 6g is located at a radially higher position compared with that of the circumferential groove 6e. In this embodiment, the wire 8 has resilient force in radially contracting direction. When the wire 8 is fitted into those shallow grooves 6g, the wire 8 is stably sustained at four positions without touching the bottom of the circumferential groove 6e. Since the wire 8 is sustained by the shallow grooves 6g of the projections 6f, i.e. at a position higher than the circumferential groove 6e, the outer surfaces 7a of the locking members 7 are held outwardly beyond the outer periphery of the guide portion 6c. Accordingly, the outer surfaces 7a of the locking members 7 come into stable contact with the conical surface 5c of the locknut 5. At the same time, the gripping portions 7b of the locking member 7 can be prevented from protruding radially inwardly beyond the core member 6, resulting that the pipe P can be inserted smoothly into the core member 6.

Figure 14:
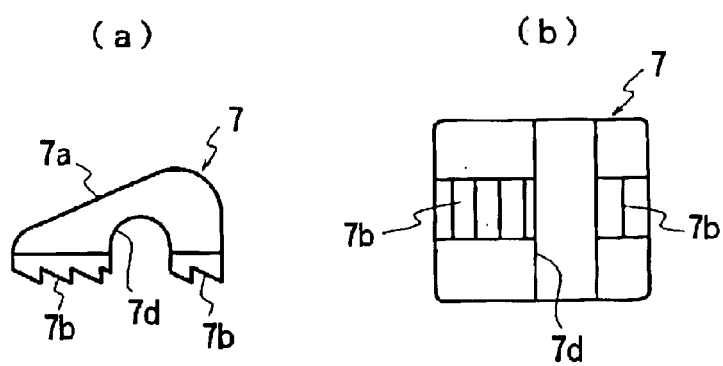
FIG. 14 shows a side view and a bottom view of the locking member used in the pipe joint shown in FIG. 10.

The locking member 7 according to this embodiment is suitable for gripping a pipe of small thickness. As shown in FIG. 14, a gripping portion 7b that is smaller in width than the locking member 7 is formed in the center of the inner surface in the widthwise direction. This gripping portion 7b is also formed by a dentiform serration having a sawlike cross section. Although a transverse groove 7d, which passes through the center of gravity of the locking member 7, is formed in the inner surface, the longitudinal groove as shown in FIG. 8 is not formed. When the locknut 5 is tightened strongly, the gripping portion 7b of the locking member 7 dents the pipe P radially inwardly to form a longitudinal hollow on the pipe P. As a result, when the pipe P is pulled outwardly in the axial direction, the pipe P is prevented from withdrawal by a large gripping force of the locking members 7. Due to the fact that the gripping portion 7b is smaller in width than the locking member 7, the gripping portion 7b can easily dent the pipe P even when the locknut 5 is tightened with a relatively small torque. The longitudinal hollow is advantageous because it generates a sufficient gripping force whereas it scarcely reduces the inner cross section of the pipe P to be passed through by the fluid.

Figure 15:
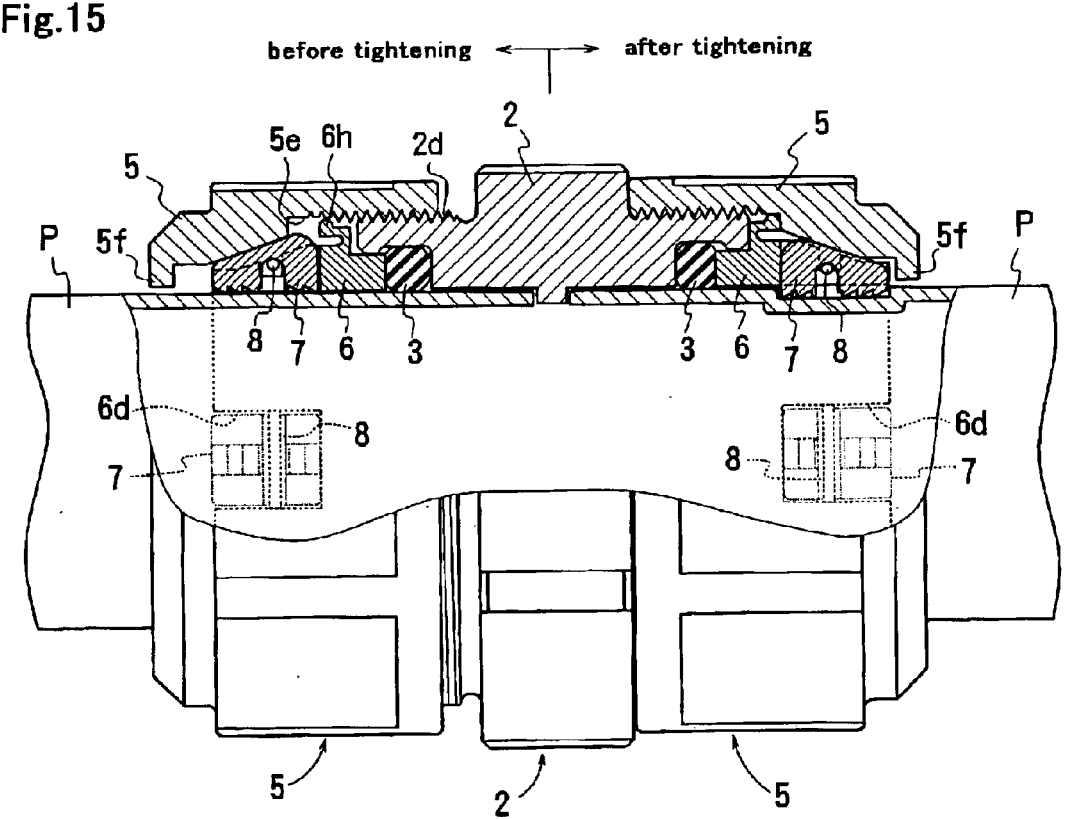
FIG. 15 is a part sectional side view showing a fourth embodiment in which the present invention is applied to a pipe joint.
Figure 16:
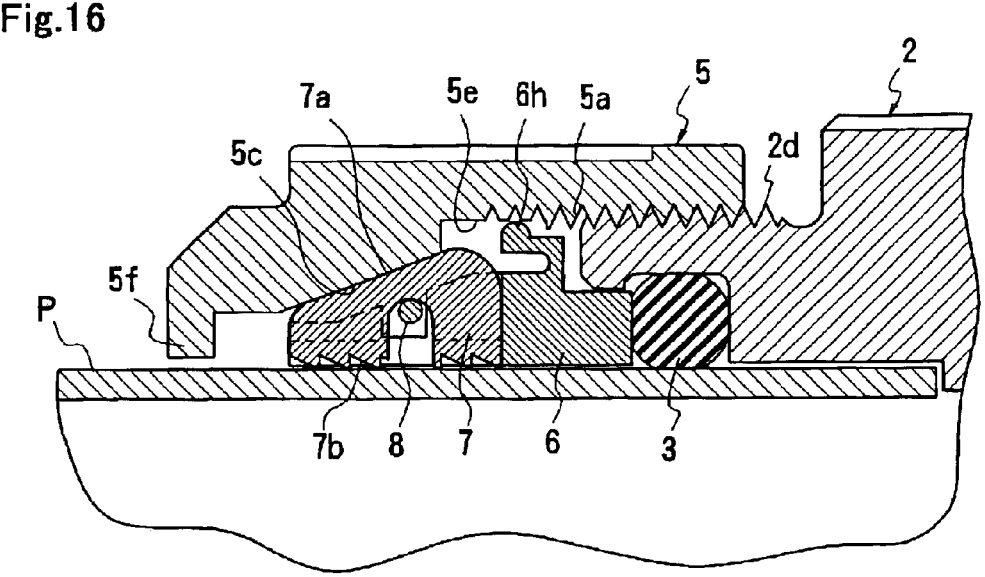
FIG. 16 is a partially enlarged sectional view showing the pipe joint shown in FIG. 15

FIGS. 15 and 16 show a fourth embodiment of the pipe joint according to the present invention.

In this embodiment, the core member 6, the locking members 7 and the wire 8 are attached into the locknut 5 to form a sub-assembly. Therefore, instead of the stopper ring 15 employed in the third embodiment, a claw portion 6h is integrally formed in the outer periphery of the core member 6 projecting outwardly in radial direction. The claw portion 6h engages with the inner peripheral groove 5e of the locknut 5 so as to prevent the core member 6 from dropping off in the axial direction freely. Preferably, the core member 6 in this embodiment is made of resin. Since the claw portion 6h can deflect radially, the core member 6 can be smoothly inserted into the locknut 5.

According to this embodiment, an inner flange 5f, which protrudes radially inwardly beyond the internal conical surface 5c, is formed in the inner surface of the locknut 5 at its one end in the axial direction. The inner flange 5f prevents the locking member 7 from slipping out of the locknut 5 over the conical surface 5c, when a large tensile force acts on the pipe P at the tightened position (see the right hand side of FIG. 15).

The joint body 2 and the locking member 7 in this embodiment are identical to those in the third embodiment.

Besides the pipe joint, the present invention can be applied for a various kinds of fluid devices, such as a water stop valve, a pressure-reducing valve, and a check valve.

Figure 17:
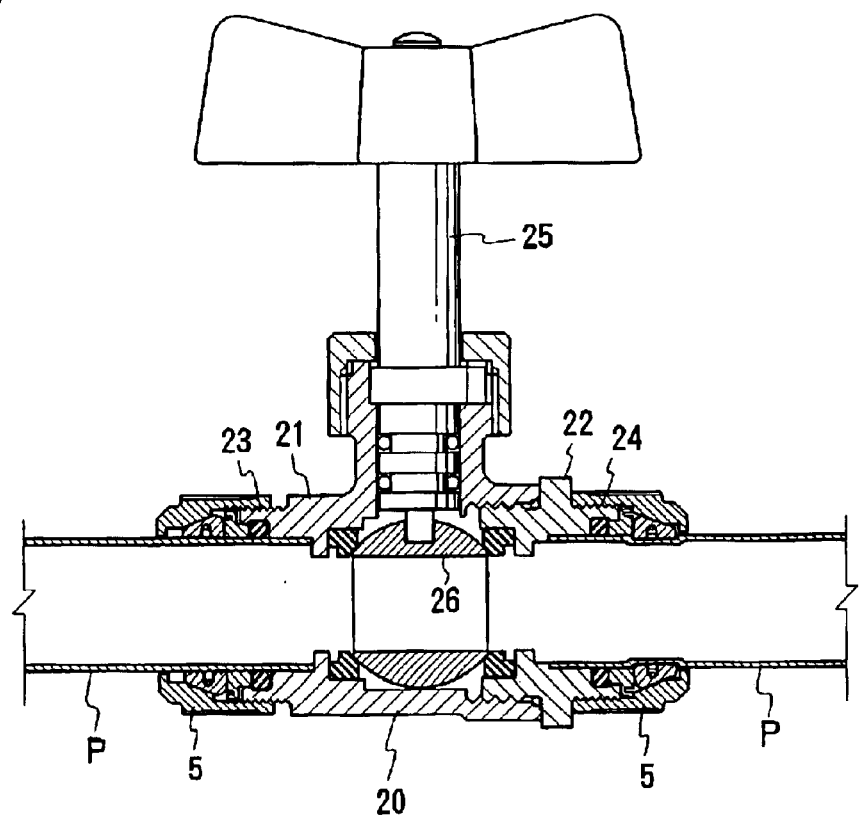
FIG. 17 is a longitudinal sectional view showing a fifth embodiment in which the present invention is applied to a water stop valve.

FIG. 17 shows an embodiment of a water stop valve, in which the present invention is applied.

In this embodiment, the water stop valve body 20 has an inlet opening 21 and an outlet opening 22 at both ends thereof for receiving pipes P. Those openings 21 and 22 have, in their outer peripheries, external threads 23 and 24 respectively so as to engage with internal threads of the locknuts 5. The valve body 20 also has a spindle 25 for rotating a ball valve 26.

According to this embodiment, after the pipes P are inserted into the inlet and outlet openings 21 and 22, the pipes P can be coupled to the valve body 20 easily by tightening the locknut 5 in which the core member 6, the locking member 7 and the wire 8 are previously assembled.

Figure 18:
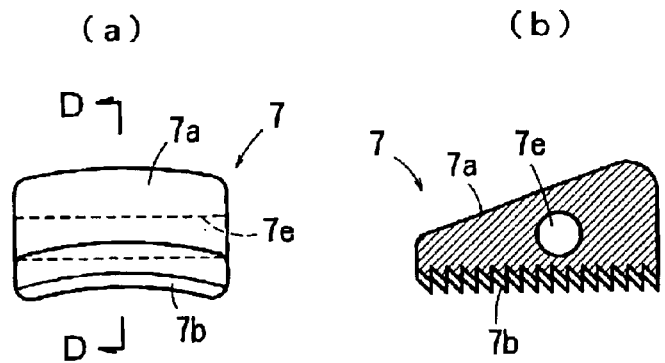
FIG. 18 shows a front view and a section taken on the line D—D of a third embodiment of the locking member.

FIG. 18 shows a further embodiment of the locking member 7.

This locking member 7 has a through hole 7e extending in the widthwise direction to be passed through by the wire 8. The diameter of the through hole 7e should be larger than the wire diameter. In this case, the locking members 7 can be securely prevented from dropping out of the core member 6.

In this embodiment, the gripping portion 7b is formed all over the inner surface of the locking member 7 without the longitudinal groove 7c and the transverse groove 7d. However, the configuration of the gripping portion 7b is not restricted. It can be configured as shown in FIG. 8 or FIG. 14, for example.

Figure 19:
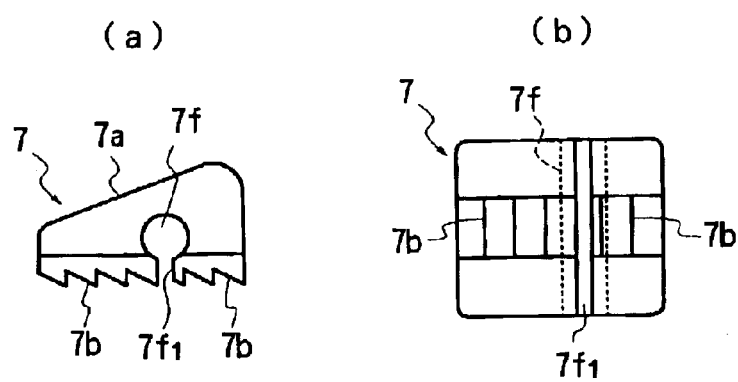
FIG. 19 shows a side view and a bottom view of a fourth embodiment of the locking member.

FIG. 19 shows a still further embodiment of the locking member 7.

According to this embodiment, the locking member 7 has a transverse groove 7f that has a keyhole-shaped cross section extending in the widthwise direction in its inner surface. The width of a narrow opening 7f1 of the transverse groove 7f may preferably be substantially equal to the wire diameter of the wire 8. In this case, first the wire 8 is fitted into the outer periphery of the guide portion 6c of the core member 6, and then the locking members 7 are inserted into the apertures 6d in such a way that the wire 8 is received in the transverse groove 7f through the narrow opening 7f1. Since the locking members 7 do not drop off from the core member 6 easily, the core member 6 together with the locking members 7 can easily be assembled into the locknut 5.

Figure 20:
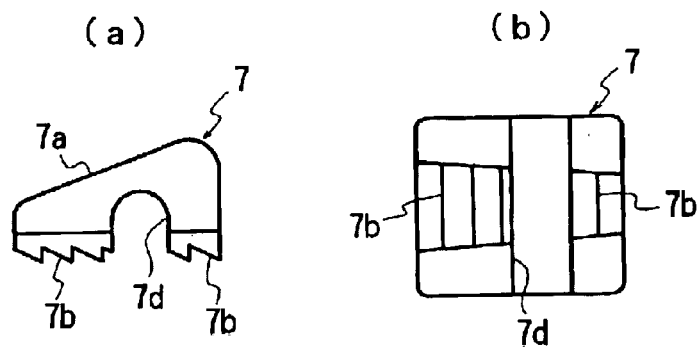
FIG. 20 shows a side view and a bottom view of a fifth embodiment of the locking member.

FIG. 20 shows an additional embodiment of the locking member 7.

According to this embodiment, the gripping portion 7b of the locking member 7 increases in width from one end (having a larger thickness) to the other end (having a smaller thickness).

In this case, when the locknut 5 is tightened, the gripping portion 7b engages with the pipe P in narrower area at the one end of the locking member 7, and in wider area at the other end of the locking member 7, so as to dent the pipe P to form a trapezoidal hollow thereon. Due to this shape of the gripping portion, the locking members 7 can exert larger gripping force toward the pipe P, as compared with a case in which the locking member has a gripping portion having a constant width as shown in FIG. 14.

Figure 21:
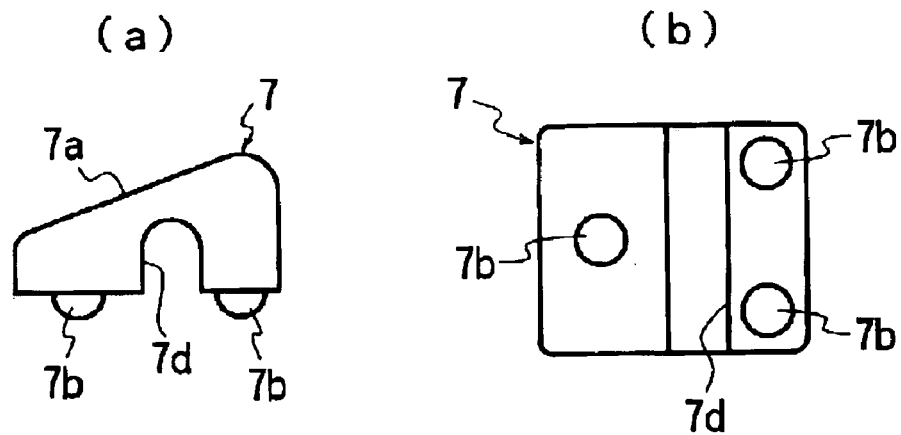
FIG. 21 shows a side view and a bottom view of a sixth embodiment of the locking member.

FIG. 21 shows a further additional embodiment of the locking member 7.

In this embodiment, the locking member 7 has, in its inner surface, a plurality of non-sharpened gripping portions 7b. The locking member 7 shown in FIG. 21 has one hemispherical gripping portion 7b at its thinner side, and two hemispherical gripping portions 7b at its thicker side. However, the locking member 7 may also have two gripping portions 7b at its thinner side and one at its thicker side.

The locking member 7 according to this embodiment is suitable for gripping a pipe of small thickness. The non-sharpened gripping portions 7b dent into the outer periphery of the pipe P inwardly so as to exert a desired gripping force to the pipe P. When the pipe P is pulled outwardly, each of those gripping portions 7b makes a streak on the pipe surface respectively, to prevent withdrawal of the pipe.

The present invention is not limited to the above-described embodiments, but can be modified within the scope of the invention.

Figure 22:
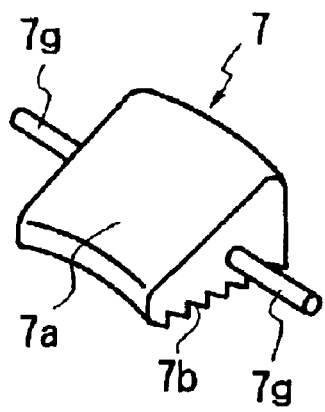
FIG. 22 shows a perspective view of a seventh embodiment of the locking member.

For example, although the substantially annular wire 8 is used so as to prevent the locking member 7 from being dropped out inwardly in the above embodiment, the wire 8 may be replaced by some other alternatives. The locking member 7 may have, e.g., pins 7g projecting from its both sides as shown in FIG. 22, in such a way that those pins 7g may fit into the circumferential groove 6e of the core member 6 so as to prevent the locking member 7 from being dropped out inwardly. These pins 7g may be formed by a short wire fixedly pierced through a hole running in the widthwise direction in the locking member 7, for example.

Other than those pins 7g, alternative methods for retaining the locking members 7 in the apertures 6d of the core member 6 could be taken.

In case the substantially annular wire 8 that has resilient force in expanding direction is used, the circumferential groove 6e may be formed in the inner periphery of the core member 6.

The outer surface 7a of the locking member 7, which comes into pressure contact with the internal conical surface 5c of the locknut 5, should not necessarily be a conical surface, but could simply be an inclined surface, or could have a plurality of ribs extending in the circumferential direction. The outer surface 7a could be in any shape as long as the locking member 7 can move radially inwardly by the pressing contact with the internal conical surface 5c of the locknut 5 when the locknut 5 is tightened.

The configuration of the gripping portion 7b formed in the inner surface of the locking member 7 is not restricted to the serrations having sawlike cross section or hemispherical projections as shown in the above described embodiments. The gripping portion 7b can take any configuration such as spike-like projections or unsharpened serrations as long as it can prevent withdrawal of the inserted pipe P from the joint body 2.

In the above-described embodiments, since the pipe P has a relatively small diameter, the core member 6 has four locking members 7. However, in case the pipe P has a larger diameter, the core member 6 may have a larger number of locking members 7.

Although the pipe-coupling devices described in the first to fourth embodiments have socket-type constructions in which both of two ends of the joint body 2 are openings to receive two pipes, the pipe-coupling device of the present invention may also have different constructions in which one end of the pipe joint is closed and the other end is an opening to receive a pipe. Further, the joint body 2 may also have three or four openings. In short, the joint body can be modified in its construction as long as it includes at least one opening.

The present invention can be applied to a coupling device for joining together not only metallic pipes such as stainless steel pipes but also hard resin pipes such as bridged polyethylene pipes.

Further, the joint body, the locknut and the core member can be formed of any material such as metallic materials or resin materials.

Although the sealing ring 3 is used as a sealing member acting between the pipe P and the joint body 2 in the above-described embodiments, a gasket having an inner lip, or any other known sealing member may be used in place of the sealing ring 3.

Furthermore, the pipe-coupling device according to the present invention can be used not only for connecting liquid pipes, but also for connecting other fluid pipes such as gas pipes.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A pipe-coupling device comprising:
a joint body (2) having an opening (2h) for receiving one end of a pipe (P) to be coupled and having external threads (2d) formed in its outer periphery around said opening (2h);
a locknut member (5) having a first end portion and a second end portion, the first end portion including internal threads (5a) in its inner periphery to engage with said external threads (2d) of said joint body (2), the second end portion including an internal conical surface (5c) which increases in diameter in an axial direction toward said first end portion;
an annular core member (6) disposed within said locknut member (5), said core member (6) having a guide portion (6c) at one end thereof and having a plurality of separate apertures (6d) formed in said guide portion (6c) spaced circumferentially from each other;
a plurality of locking members (7) received in said apertures (6d) of said core member (6), each of said locking members (7) having a gripping portion (7b) in its inner surface for contacting with an outer periphery of the pipe (P) when received in said opening (2h) of said joint body (2), and having a contact portion (7a) in its outer surface for contacting with said internal conical surface (5c) of said locknut member (5);
a substantially annular wire (8) arranged on the outer periphery of said core member (6); and
a through path (7d, 7e) formed in each of said locking members (7) extending in the widthwise direction, said through path (7d, 7e) being formed by a through hole or an inner groove such that said wire (8) passes through said through path (7d, 7e) so as to prevent the locking members (7) from being dropped out of said core member (6) inwardly in a radial direction;
wherein
upon rotation of said locknut member (5) onto said joint body (2) in a tightening direction, said internal conical surface (5c) of said locknut member (5) slidably contacts with the contact portions (7a) of said locking members (7) so as to press the locking members (7) radially inwardly to cause the gripping portions (7b) of said locking members (7) to grip said outer periphery of the pipe (P) received in said opening (2h).

2. A pipe-coupling device according to claim 1, wherein
said locking members (7) are configured to increase in thickness from one end to the other end in lengthwise direction, and wherein
the contact portions (7a) of said locking members (7) are configured to be conical surfaces or inclined surfaces whose inclinations substantially correspond to the inclination of said internal conical surface (5c) of said locknut member (5).

3. A pipe-coupling device according to claim 1, further comprising:
an internal seating (2a) formed in the inner periphery of said opening (2h) of said joint body (2);
a sealing ring (3) for acting between said joint body (2) and said inserted pipe (P), being received in said internal seating (2a) in such a way that one side surface and outer surface of said sealing ring (3) are supported by said internal seating (2a); and
a boss portion (6a) formed at the other end of said core member (6) opposite to said guide portion (6c), said boss portion (6a) being adapted to push said sealing ring (3) toward the internal seating (2a) in the axial direction.

4. A pipe-coupling device according to claim 3, wherein
said wire (8) is made of a metallic curled wire, whose terminals overlap with each other, having resilient force in radially contracting direction, wherein
said core member (6) is provided with a plurality of projections (6f) formed in said circumferential groove (6e), wherein
each of said projections (6f) has a shallow groove (6g) for sustaining said wire (8), and wherein
a bottom of said shallow groove (6g) is located at a radially higher position compared with that of said circumferential groove (6e) so that said contact portions (7a) of said locking members (7) stably contact with said internal conical surface (5c) of the locknut member (5).

5. A pipe-coupling device according to claim 1, wherein said joint body (2) is provided with a stopper wall (2g) in its outer periphery, and wherein an edge of said first end portion of said locknut member (5) is stopped by said stopper wall (2g) in order to prevent said locknut member (5) from excessive tightening.

6. A pipe-coupling device according to claim 1, wherein
said guide portion (6c) of said core member (6) is provided with a circumferential groove (6e) in its outer surface for receiving said wire (8).

7. A pipe-coupling device according to claim 1, wherein
said wire (8) is made of a metallic curled wire whose terminals overlap with each other, and wherein
said wire has resilient force in radially expanding direction so that said contact portions (7a) of said locking members (7) stably contact with said internal conical surface (5c) of the locknut member (5).

8. A pipe-coupling device according to claim 1, wherein said wire (8) is made of a metallic curled wire whose terminals overlap with each other, and wherein
said wire (8) has resilient force in radially contracting direction.

* * * * *